Jan. 17, 1933.  B. MARKHAM  1,894,698
AUTOMATIC DIFFERENTIAL FOR FOUR-WHEEL ATTACHMENTS
Filed March 16, 1931   2 Sheets-Sheet 1
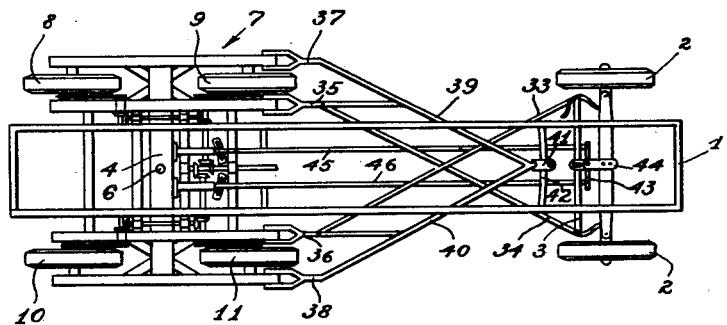
Fig-1-
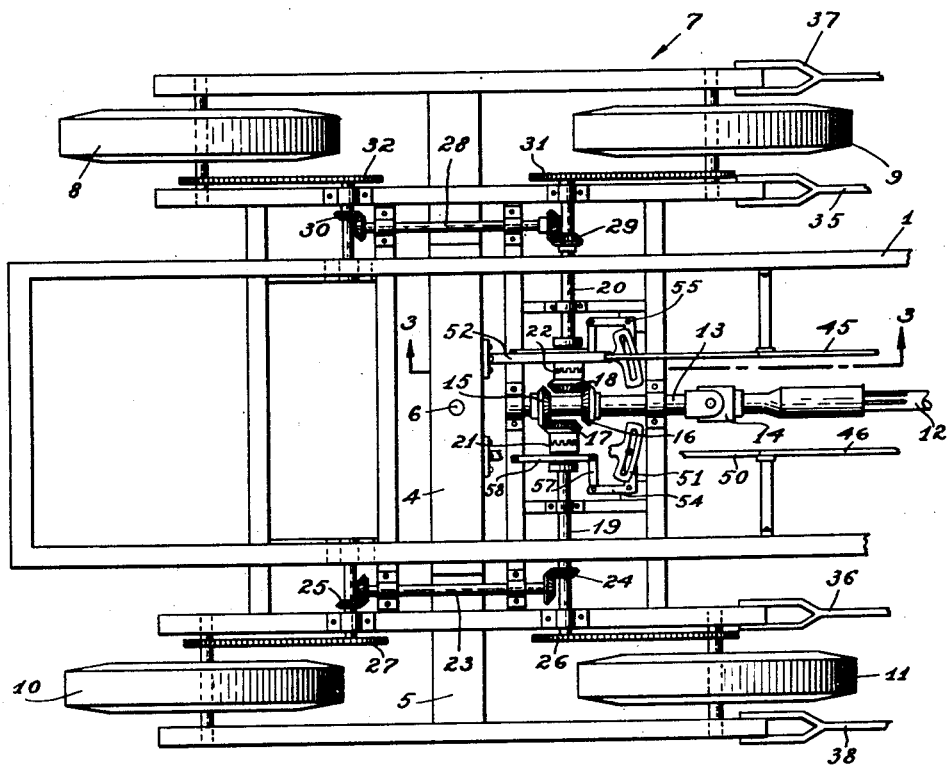
Fig-2-
INVENTOR.
BYRON MARKHAM.
BY Munn & Co.
ATTORNEYS.

Jan. 17, 1933.  B. MARKHAM  1,894,698
AUTOMATIC DIFFERENTIAL FOR FOUR-WHEEL ATTACHMENTS
Filed March 16, 1931  2 Sheets-Sheet 2
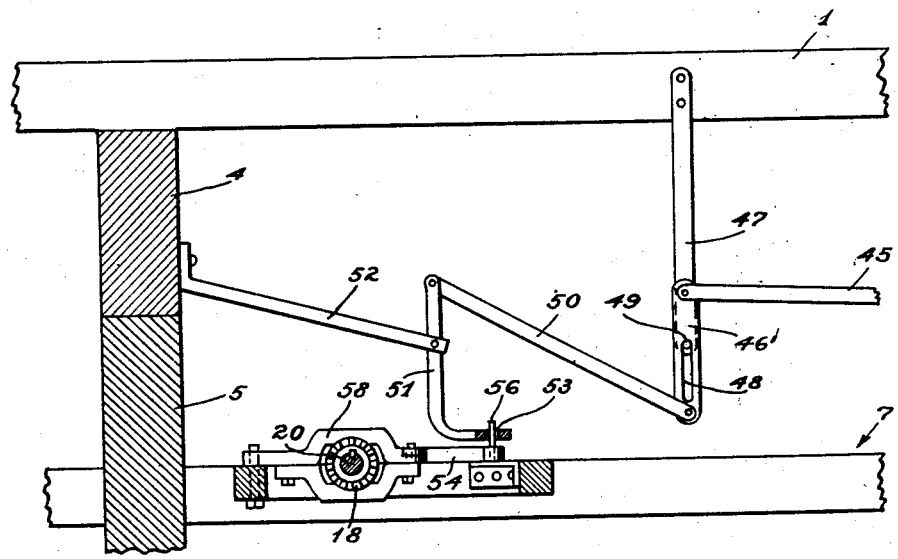
Fig-3-
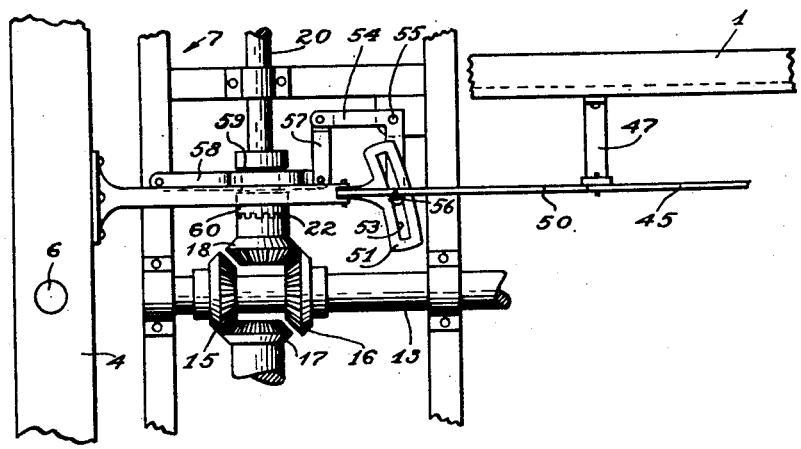
Fig-4-
INVENTOR.
BYRON MARKHAM
BY Munn & Co.
ATTORNEYS.

Patented Jan. 17, 1933

1,894,698

UNITED STATES PATENT OFFICE

BYRON MARKHAM, OF MARTINEZ, CALIFORNIA

AUTOMATIC DIFFERENTIAL FOR FOUR-WHEEL ATTACHMENTS

Application filed March 16, 1931. Serial No. 523,077.

My invention relates to improvements in automatic differentials for four-wheel attachments, and it consists of the combinations, constructions and arrangements hereinafter described and claimed.

An object of my invention is to provide an automatic differential for four-wheel attachment which has novel means for swinging the attachment when the front wheels of the truck are turned and for disengaging the wheels nearest the center of turning, from the power source during the actual turning of the attachment, and for automatically connecting the wheels to the source of power when the truck again goes in a forwardly direction.

A further object of my invention is to provide a device of the type described which is simple in construction and which is durable and efficient for the purpose intended.

Other objects and advantages will appear in the following specification, and the novel features of the device will be particularly pointed out in the appended claims.

My invention is illustrated in the accompanying drawings forming a part of this application, in which Figure 1 is a top plan view of the truck and attachment;

Figure 2 is an enlarged plan view of the attachment;

Figure 3 is a section along the line 3—3 of Figure 2; and

Figure 4 is an enlarged plan view of Figure 3.

In carrying out my invention I make use of a truck chassis 1 having the usual front wheels 2 and the steering mechanism including a tie rod 3. At the back of the truck I provide a beam 4 (see Figure 3) to which a bolster 5 is pivotally secured at 6 (see Figure 1). The particular structure of the attachment or truck support indicated generally at 7 is described and claimed in my co-pending application, Serial No. 436,573, filed March 17, 1930, and needs no description in the present case, excepting that it should be noted that the beam is rigidly secured to the chassis frame and that the bolster 5 is swingably mounted beneath the beam, the latter having a wheel-supporting frame fastened thereto (see Figures 2 and 3). The attachment 7 has four drive wheels 8, 9, 10 and 11, and these are driven by a mechanism now to be described.

A propeller shaft 12 connected to the source of power not shown rotates a shaft 13 by means of a universal joint 14. The shaft 13 has two beveled gears 15 and 16 and these are in constant mesh with beveled gears 17 and 18. The gear 17 is rotatably mounted on a stub shaft 19 while the gear 18 is rotatably mounted on a stub shaft 20. Clutches 21 and 22 normally connect the gears 17 and 18 to their respective shafts 19 and 20.

The shaft 19 is operatively connected to the drive wheels 10 and 11 by a stub shaft 23, sets of beveled gears 24 and 25 and sprocket and sprocket chains 26 and 27, which in turn are connected to the drive wheels 11 and 10 respectively. In like manner the stub shaft 20 is operatively connected to the drive wheels 8 and 9 by means of a stub shaft 28, sets of beveled gears 29 and 30 and sprocket and sprocket chains 31 and 32, which are connected to the drive wheels 9 and 8 respectively.

I provide means for swinging the attachment 7 in a direction opposite to that taken by the front wheels 2 and this means has been clearly set forth in my co-pending application.

Links 33 and 34 (see Figure 1) are connected to the ends of the tie rod 3 and extend to fork-shaped members 35 and 36 which are pivotally connected to the attachment 7. The fork-shaped members 35 and 36 are also connected to other fork-shaped members 37 and 38 and these have arms 39 and 40 which are connected together and are pivotally secured to a sliding bracket 41 disposed on an arcuate bar 42. With this construction, a turning of the front wheels 2 will cause the attachment 7 to turn in an opposite direction and the bracket 41 to slide on the bar 42.

I make use of the turning movement of the steering mechanism to automatically detach the driving wheels 8 and 9 or 10 and 11 from the source of power, the set of wheels disconnected being those disposed closest to the center of turning. Reference to Figure 1 shows a T-shaped member 43 pivotally carried by a bracket 44 and rocked about its pivot when the tie rod 3 is moved longitudinally. Links 45 and 46 extend from the arms of the T-shaped member and each actuates an identical mechanism and therefore a description of the mechanism actuated by the link 45 will suffice. This mechanism is shown in enlarged detail in Figures 3 and 4.

I have shown the end of the link 45 in Figure 3 as being connected to another link 46' that is pivotally carried by a support 47 which in turn is attached to the truck chassis 1. The link 46' has a slot 48 in which a pin 49 rides. The pin is carried by the support 47. Still another link 50 is pivotally connected to the link 46' and to a lever 51 pivotally carried by a support 52, which in turn is secured to the beam 4. It should be noted that the links 45, 46 and 50 move in a vertical plane.

The lever 51 has a horizontally disposed arcuate slot 53 (see Figure 4) formed in the bottom of the lever. A bell crank lever 54 is pivoted at 55 and carries a pin 56 that rides in the slot 53. A link 57 connects the other end of the bell crank lever with a clutch moving arm 58. The arm 58 is pivoted to a portion of the attachment 7 and is received in an annular groove 59 in the part 60 of the clutch 22.

When the front wheels 2 are turned so as to move the link 45 to the left in Figure 3 the link 50 will be moved forwardly and will cause the slot 53 to move to the left in Figure 4 and to rock the bell crank lever 54 in a clockwise direction to release the clutch 22 whereby the stub shaft 20 will cease to be rotated by the gear 18. The drive wheels 8 and 9 will now coast while power is applied to the drive wheels 10 and 11.

When the front wheels 2 are turned in the opposite direction the link 45 will be moved to the right in Figure 3 while the attachment 7 in Figure 1 will be moved in a counter-clockwise direction. This will require an extension of the parts between the link 45 and the lever 51 in order to prevent the binding of the pin 56 in the slot 53. This slight extension is taken care of by the link 46' moving upwardly, the pin 49 moving along the slot 48 during this operation. As soon as the front wheels 2 return to normal position and likewise the attachment 7, the link 46' will drop into the position shown in Figure 3 due to gravity. Slots 53 are provided in the levers 51 to permit the attachment 7 to swing without causing the pins 56 to bind. The entire connecting and disconnecting of the drive wheels is done automatically by the means just disclosed.

Although I have shown and described one embodiment of my invention it is to be understood that the same is susceptible of various changes and I reserve the right to employ such changes as may come within the scope of the claims hereto annexed.

I claim:

1. In combination, a tie rod, a T-shaped swingably mounted member operated by the tie rod, links connected to the arms of the T-shaped member, an attachment, two sets of drive wheels supporting the attachment, a driving shaft, separate connections between the driving shaft and each set of drive wheels and including clutches, and operating means connecting the links with the clutches, the means disposed on the side of the vehicle having the clutch in operative position, being extended.

2. In combination, a chassis, a tie rod, a lever actuated by the moving of the rod, an attachment pivoted to the chassis, driving wheels supporting the attachment, driving means for the wheels on each side of the attachment, a common drive means, clutches connecting the wheel driving means with the common drive means, separate mechanisms connecting the lever with each clutch for disengaging the inner driving wheels, each mechanism having automatic lengthening means operative on the engaging clutch.

BYRON MARKHAM.